United States Patent [19]

Sakaguchi et al.

[11] Patent Number: 4,831,387

[45] Date of Patent: May 16, 1989

[54] THERMAL TRANSFER RECORDING APPARATUS HAVING ERASING FUNCTION

[75] Inventors: Masatoshi Sakaguchi, Gifu; Osamu Sakaue, Nagoya, both of Japan

[73] Assignee: Brother Kogyo Kabushiki Kaisha, Nagoya, Japan

[21] Appl. No.: 195,308

[22] Filed: May 18, 1988

[30] Foreign Application Priority Data

May 19, 1987 [JP] Japan ............................ 62-123468

[51] Int. Cl.[4] .......................... G01D 15/10; B41J 3/20

[52] U.S. Cl. .............................. 346/76 PH; 400/120

[58] Field of Search .................... 346/76 PH; 400/120

[56] References Cited

U.S. PATENT DOCUMENTS 4,453,839 6/1984 Findlay et al. ..................... 400/120

4,591,876 5/1986 Nozaki et al. ................. 346/76 PH

*Primary Examiner*—E. A. Goldberg

*Assistant Examiner*—Gerald E. Preston

*Attorney, Agent, or Firm*—Finnegan, Henderson, Farabow, Garrett & Dunner

[57] ABSTRACT

In accordance with a printing data, resistive thermo-generating elements in a thermal head are selectively heated to a relatively high temperature and a heat-fusible solid ink on an ink ribbon is thereby melted and the melted ink is transferred to a printing paper, thereby printing characters on a printing sheet. The printed characters can be erased by contacting to the printed portion of the printing sheet the ink ribbon heated by the thermal head to a relatively low temperature. In order to prevent the printing and erasing qualities from being deteriorated due to the change in the environmental temperature, the duration of current application to the resistive thermo-generating elements is compensated for individually for printing and erasing modes in response to the change in the environmental temperature.

10 Claims, 5 Drawing Sheets

THERMAL TRANSFER RECORDING APPARATUS HAVING ERASING FUNCTION

BACKGROUND OF THE INVENTION

The present invention relates to a thermal transfer recording apparatus having dual modes, i.e., printing and erasing as required (hereinafter erasure mode is sometimes referred to as correction).

A prior art thermal transfer recording apparatus of the type contemplated by the present invention is a printer which includes an ink ribbon coated with a heat-fusible solid ink, a thermal head disposed to face a sheet of recording paper with the ink ribbon interposed and which is equipped with a plurality of resistive thermo-generating elements, and a drive circuit for supplying an appropriate amount of electric power to the resistive thermo-generating elements. The ink ribbon used in this printer has a solid ink layer supported on the surface of a film base made of a suitable material such as polyester. the solid ink melts at a temperature of about 150° C. and above and provides increased adhesion in the molten state. At ambient temperatures, the solid ink is not sticky and will remain on the base without being transferred to the recording paper even if it is pressed against the latter with the thermal head. However, if it is heated with the resistive thermo-generating elements, the ink will melt and is transferred to the printing paper to produce desired characters. If the unused portion of the ink ribbon is pressed against the solid ink portion transferred onto the printing paper and if the solid ink is heated with electric power being supplied to the resistive thermo-generating elements in a smaller quantity than is supplied during ink transfer, only the surface of the solid ink layer fuses to cause the surfaces of the solid ink portions on the printing paper and ink ribbon to adhere to each other. If the ink ribbon is therafter separated from the printing paper, the solid ink layer is peeled off the printing paper, thereby achieving erasure of the printed characters.

The thermal printer of the type described above is a convenient device in that it enables characters to be printed on various kinds of printing paper and permits them to be erased as required in a simple way by slightly changing the quantity of power to be supplied to the resistive thermo-generating elements. However, this printer still has room for improvement in the following points.

If the temperature of the environment in which the printer is used varies considerably, it frequently occurs that the quality of printed characters deteriorates or complete erasure of them is difficult to achieve. The principal cause of this problem is that printing and correction are accomplished by different mechanisms. If the printing mode is used as the criterion for adjusting the quantity of power according to the environmental temperature, good results will not be attained in the correction mode. If, on the other hand, the correction mode is used as the criterion for adjusting the quantity of power according to the environmental temperature, good results will not attained in the printing mode.

SUMMARY OF THE INVENTION

Accordingly, an object of the present invention is to provide a thermal transfer recording apparatus capable of accomplishing both printing and erasure in an effective way in spite of change in the environmental temperature.

The above and other objects of the present invention can be attained by a thermal transfer recording apparatus comprising: a thermo-generating means having a predetermined number of thermo-generating elements; a voltage applying means connected to the predetermined number of thermo-generating elements; a means carrying a heat-fusible ink, the ink, when heated by the thermo-generating means to a first temperature, being melted to be adhearable to a recording sheet to be capable of recording if the recording sheet is held in contact with the ink carrying means and the ink carrying means adsorbing the ink adhered to the recording sheet to perform erasing when the ink is heated by the thermo-generating means to a second temperature, wherein the second temperature is different from the first temperature; a detection means for detecting an environmental temperature of the apparatus and outputting a temperature signal indicative of the detected environmental temperature; a switching means having the same number of switching elements as the plurality of thermo-generating elements, each of the switching elements being connected in one-to-one correspondence to each of the thermo-generating elements and the switching elements being selectively rendered in ON state in response to a printing data for causing the associated thermo-generating elements to generate heat by a current flowing through the thermo-generating elements by a voltage applied by the voltage applying means; a mode identifying means for identifying one of a printing mode and an erasing mode and outputting a mode signal indicative of one of the printing mode and the erasing mode; and a control means for controlling heat generation of the thermo-generating means in response to the temperature signal, the heat generation of the thermo-generating means being controlled to cause the ink carrying means to the first temperature when the mode signal is indicative of the printing mode and to cause the ink carrying means to the second temperature when the mode signal is indicative of the erasing mode.

According to the thermal transfer recording apparatus of the present invention, the thermo-generating means is controlled to generate heat according to the detected environmental temperature so that the temperature of the ink on the ink carrying means is raised to the first temperature or the second temperature depending upon the mode of operation. Specifically, in the printing mode, the temperature of the ink on the ink carrying means is raised to the first temperature to melt the ink to be adherable to the recording paper, whereby printing of characters is performed in accordance with a printing data. In the erasure mode, the temperature of the ink on the ink carrying means is raised to the second temperature to be capable of adsorbing the ink adhered to the recording paper, whereby the characters printed on that sheet is erased. If the ink carrying means, such as an ink ribbon, to be used in the present invention has the environmental temperature vs. current application time (or the quantity of power to be supplied) profiles depicted in FIG. 5 for printing and erasure modes, the concept of the present invention requires that the time during which a current is applied in printing and erasure modes be individually compensated for according to the environmental temperature.

DETAILED DESCRIPTION OF THE PREFERRED EMBODIMENTS

Figure 1:
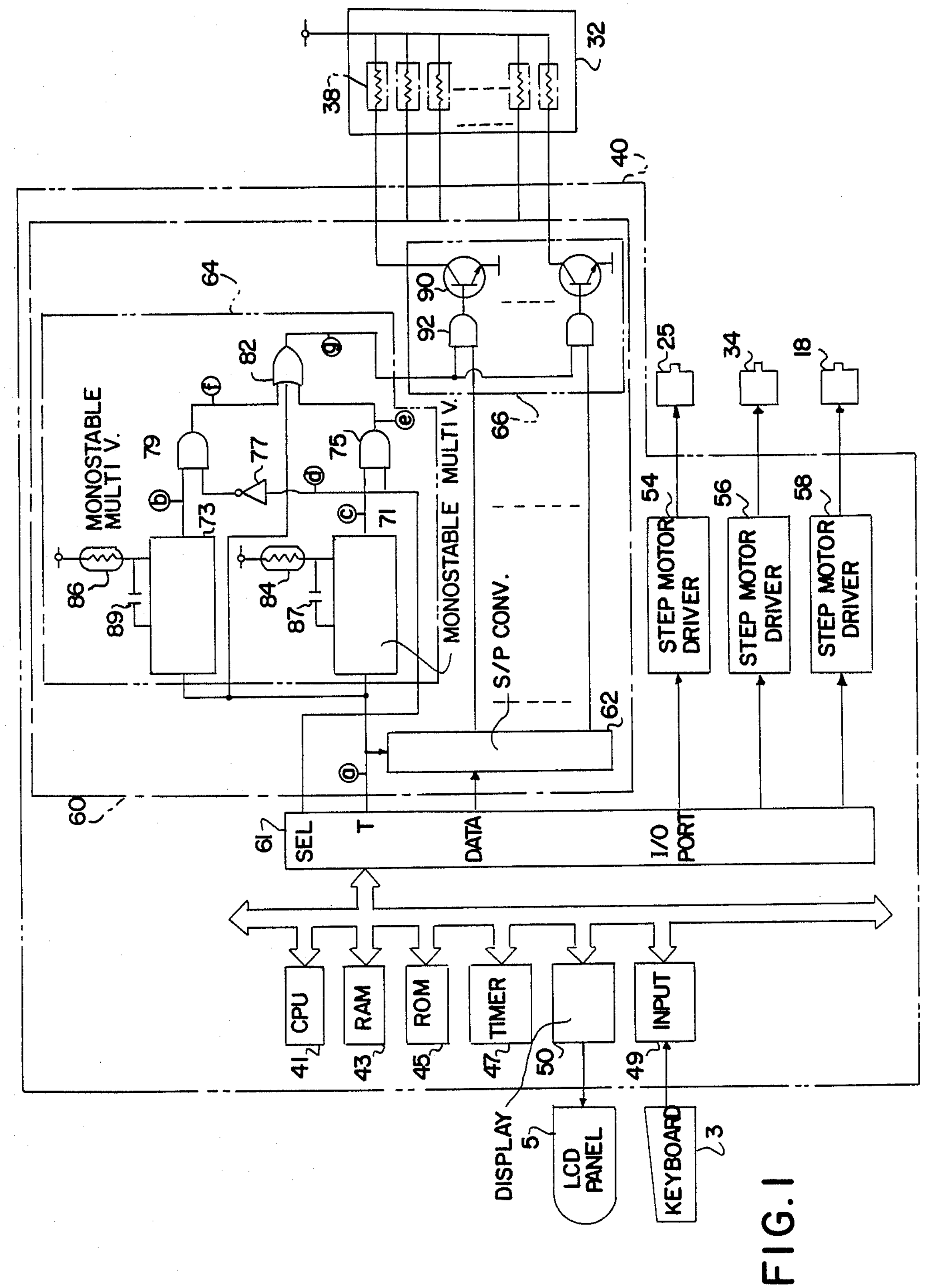
FIG. 1 is a block diagram showing an arrangement of an electronic control unit to be installed in the thermal transfer recording apparatus of the present invention.
Figure 2:
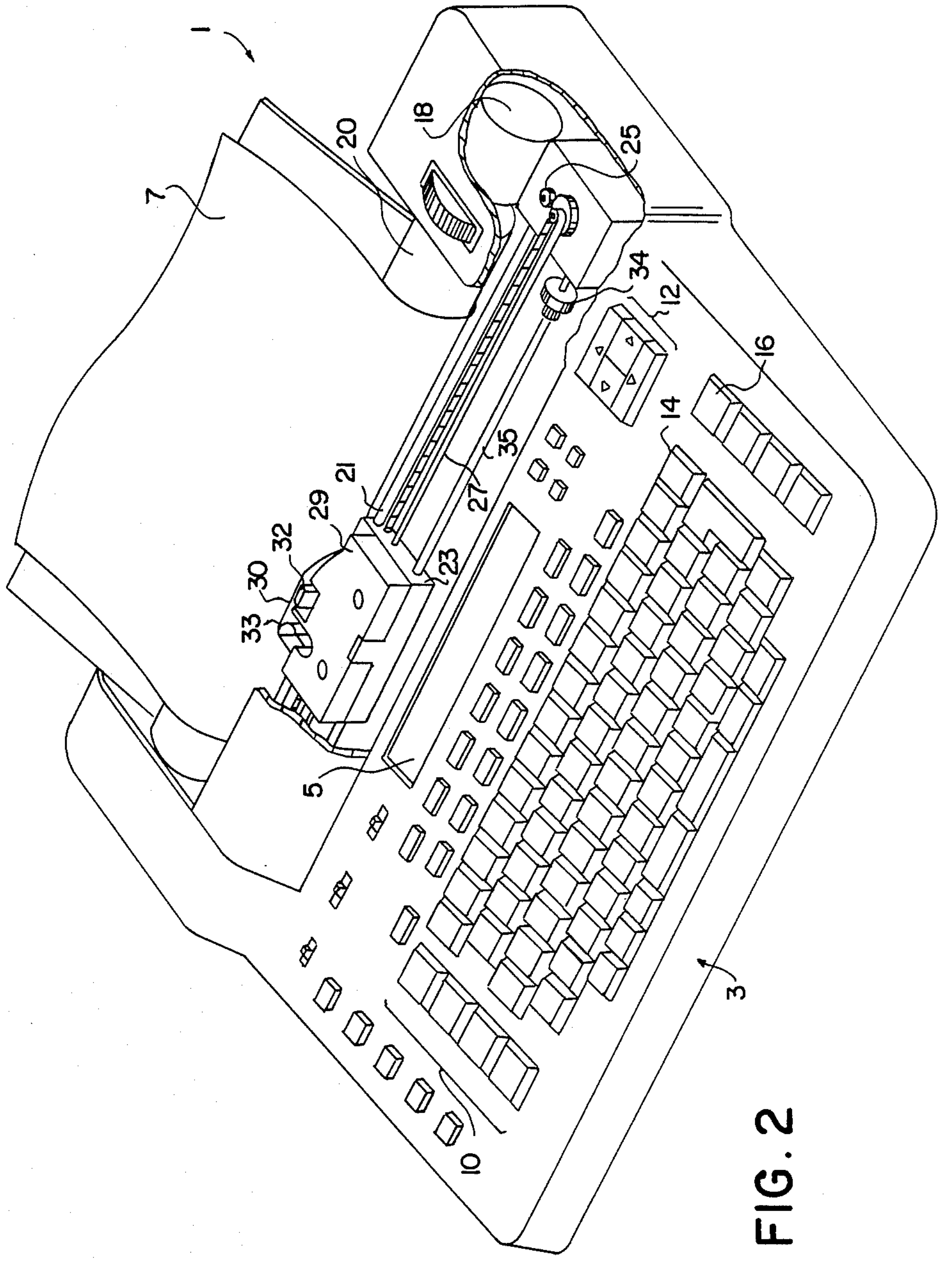
FIG. 2 is a partial fragmentary perspective view of a word processor incorporating the apparatus of the present invention.

An embodiment of the thermal transfer recording apparatus of the present invention will be described hereinafter. FIG. 1 shows schematically the arrangement of an electronic control unit for controlling the apparatus of this embodiment. FIG. 2 shows the general layout of a word processor with a built-in thermal transfer printer.

The arrangement of the word processor will firstly be described with reference to FIG. 2. As shown, the word processor 1 generally comprises a keyboard 3 with a set of keys, a liquid-crystal display panel 5 capable of displaying up to 24 characters in response to printing data inputted by manipulation of the keyboard 3, and a thermal transfer printer 9 for printing characters on a sheet of printing paper 7.

The keyboard 3 contains a set of keys including character keys 10, cursor moving keys 12, a printing key 14 for commanding the start of printing, and an erase key 16 for effecting erasure of printed characters.

The printer 9 is composed of the following components: a platen 20 to be rotated with a step motor 18; a guide bar 21 disposed parallel to the platen 20; a carriage base 23 slidably supported on the guide bar 21; a timing belt 27 which partly engages the carriage base 23 and which is moved by the rotating force of a step motor 25; a ribbon cassette 29 installed on the carriage base 23 and which contains an ink ribbon 30; a thermal head 32 and a correction blade 33 across which the ink ribbon 30 is stretched; and a drive shaft 35 which permits the thermal head 32 and correction blade 33 to be moved toward or away from the operator by the rotating action of a step motor 34.

Figure 3:
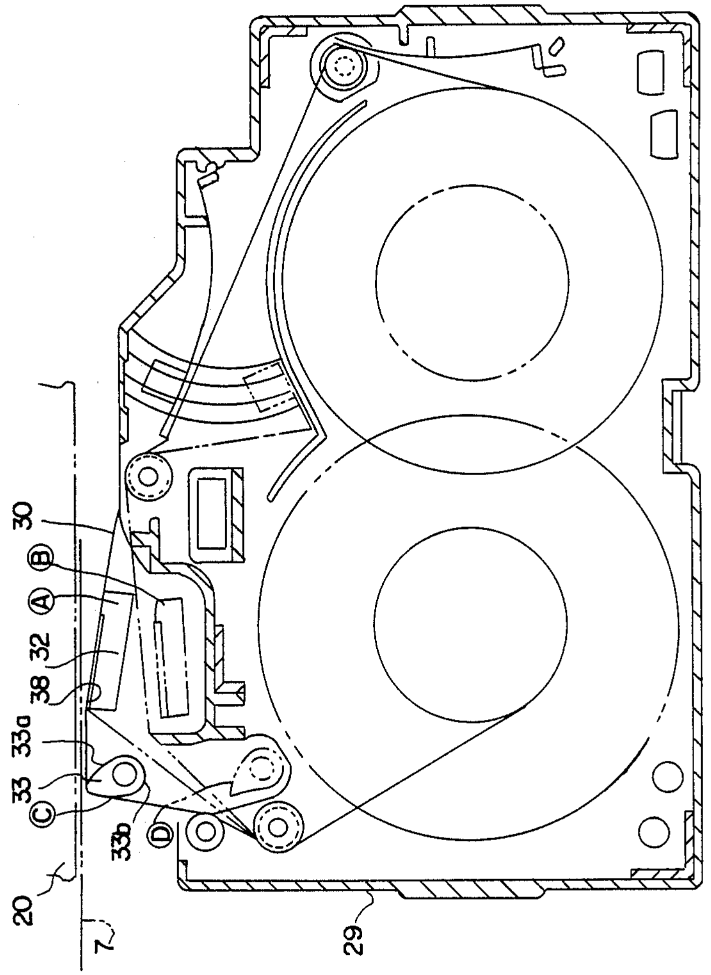
FIG. 3 is a cross-sectional view showing the layout of components around a ribbon cassette.

Details of the thermal head 32 and correction blade 33 will be described hereinafter with reference to FIG. 3, which shows the ribbon cassette 29 on the carriage base 23 with its cover removed. The thermal head 32 has a row 24 resistive thermo-generating elements 38 exposed at its front end in a row in a vertical direction perpendicular to the paper. The thermal head 32 is driven by the rotation of the drive shaft 35 and moves the ink ribbon 30 either to the position where it presses the ink ribbon 30 against the printing paper 7 (this position is indicated by (A) in FIG. 3) or to the position wherein the ink ribbon 30 is separated from the printing paper 7 (this position is indicated by (B) in FIG. 3). The correction blade 33 which is also driven by the rotation of the drive shaft 35 moves the ink ribbon either to the position where it presses the ink ribbon 30 against the printing paper 7 (this position is indicated by (C) in FIG. 3) or to the position where the ink ribbon 30 is separated from the printing paper 7 (this position is indicated by (D) in FIG. 3). When the thermal head 32 is at position (A) and the correction blade 33 at position (D), printing is performed. When the thermal head 32 is at position (A) and the correction blade 33 at position (C), correction is performed. As shown, the correction blade 33 is columnar member whose cross section taken perpendicularly to the axis is shaped like a teardrop. The correction blade 33 is installed in such a way that its sharp angled portion faces the platen 20. Therefore, in a correction mode, the ink ribbon 30 is stretched between the correction blade 33 in position (C) and the thermal head 32 in position (A). As a result, the ink ribbon 30 is brought substantially parallel to the printing paper on the platen 20, producing a sufficient peel angle to ensure that the ink is peeled off from the printing paper.

The ink ribbon 30 to be pressed against the printing paper 7 by the action of the thermal head 32 or the correction blade 33 has a solid ink coating formed on the surface of a film base made of a suitable material such polyethylene. The solid ink is composed of a low-viscosity resin such as an ethylene/vinyl acetate copolymer resin or an ethylene/ethyl acrylate resin, a high-viscosity resin such as polyvinyl alcohol, and a colorant. This ink fuses at a temperature of about 150° C. and above and produces increased adhesion in the molten state. Therefore, in printing mode, the solid ink is melted by heating with the resistive thermo-generating elements 38 on the thermal head 32 and becomes sticky enough to be transferred onto the printing paper 7. In correction mode, the unused portion of the ink ribbon 30 is pressed by the thermal head 32 against the transferred solid ink portion. If the resistive thermo-generating elements 38 are supplied with a smaller quantity of power than is supplied in the printing mode, the surfaces of solid ink portions on the printing paper 7 and the ink ribbon 30 are heated to fuse together. Subsequently, the ink ribbon 30 is wound up on a spool as the carriage base 23 is moved to the right in FIG. 3. When the tip of the correction blade 33 reaches the adherence portion of the two solid ink layers, the solid ink layer adhering to the ink ribbon 30 is peeled off from the printing paper 7.

As described above, the printer 9 performs thermal transfer of the solid ink by applying a current to the resistive thermo-generating elements 38 on the thermal head 32 according to a specific printing pattern on each occasion the carriage base 23 is moved transversely by an amount corresponding to one dot. If the thermal head 32 is moved serially by an amount corresponding to 24 dots, a character having a resolution of 24×24 dots is printed. If a wrong character is printed, a current is applied to the thermo-generating elements 38 to produce heat according to the printing pattern of that character and the thermal head 32 is moved serially by an amount corresponding to 24 dots, achieving correction of the wrong character by the mechanism already described. The operation of the printer 9 is controlled by the electronic control unit 40 installed in the word processor 1.

The electronic control unit 40 will be described hereinafter with reference to FIG. 1. As shown, the electronic control unit 40 is basically copmposed of CPU 41, RAM 43 and ROM 45, all being known in the art, as well as a timer circuit 47, an input circuit 49 and a display circuit 50. The timer circuit 47 is activated by CPU 41 and supplies the latter with an interrupt signal which is generated at a preset interval of T1 which is 1.0 msec in the embodiment being discussed. The input circuit 49 receives the printing data associated with keys depressed by the operator and input data is temporarily stored in RAM 43 in response to a command from CPU 41. The printing data received in the input circuit 49 is processed by the display unit 50 and displayed on the liquid-crystal display panel 5.

The electronic control unit 40 also contains a driver 54 for driving the step motor 25 used to transport the carriage base 23, a driver 56 for driving the step motor 34 used to press the thermal head 32 against the platen 20, a driver 58 for driving the step motor 18 used to rotate the platen 20, and a power supply circuit 60 for applying current to the thermal head 32. These circuits are connected to CPU 41 via an I/O port 61.

The power supply circuit 60 includes a serial/parallel converter 62 in which temporarily stored is the printing data sent from CPU 41 via I/O port 61, a circuit 64 for setting the duration of current application, and a drive circuit 66 for applying currents to the resistive thermo-generating elements 38. The serial/parallel converter 62 contains a 24-bit shift register (not shown) and stores 24 bits upon sequentially shifting the printing data in serial form outputted from the data terminal DATA of I/O port 61. The stored 24-bit printing data is sent in parallel fashion to the drive circuit 66 in response to the rising edge of an output signal from the timing terminal T of I/O port 61.

The current application duration setting circuit 64 is composed of the following elements: two monostable multivibrators 71 and 73 for printing and correction modes, respectively, which are triggered in response to the falling edge of the signal from the timing terminal T of I/O port 61; an AND gate 75 having two input terminals, one connected to the output of the monostable multivibrator 71 for printing mode and another to the select terminal SEL of I/O port 61 which performs mode identification (whether the mode to be executed is printing mode or correction mode); an AND gate 79 having two input terminals, one connected to the output of the monostable multivibrator 73 for correction mode and another to the select terminal SEL of I/O port 61 through an inverter 77; and an OR gate 82 having three input terminals connected to the outputs of the two AND gates 75 and 79 and to the output of the timing terminal T of I/O port 61.

Monostable multivibrators 71 and 73 are connected to thermistors 84 and 86, respectively, whose resistance varies depending upon the change in temperature. A pulse signal is produced from the monostable multivibrator 71 (or 73), the duration of which is determined by the thermistor 84 (or 86 and a capacitor 87 (or 89). The duration of this pulse signal contributes to the duration of current application, and the thermistor 86 for correction mode has a smaller temperature coefficient of resistance than the thermistor 84 for printing mode. The period during which a current is to be applied in correction mode is determined in consideration of the amount of heat required until that part of the ink ribbon 30 which has been heated upon application of a current to the resistive thermo-generating elements 38 is cooled as it travels to the tip of the correction blade 33 where it is lifted off from the printing paper 7.

The circuit 66 for driving the resistive thermo-generating elements 38 includes as many switching transistors 90 as the thermo-generating elements, and AND gates 92 connected to the bases of these transistors. One of the two input terminals of each of the AND gates 92 is connected to the output terminal of OR gate 82 in the current application duration setting circuit 64 whereas the other input terminal is connected to the associated output terminals of the serial/parallel converter 62. If AND gate 92 produces an active high-level signal at its output terminal, the associated switching transistor 90 is turned on to thereby apply a current to the associated resistive thermo-generating element 38.

The electronic control unit 40 having the arrangement described above will operate as follows. In a printing mode, a specified vertical row of 24-bit data in the printing data of 24 ×24 dots stored in RAM 43 is sequentially read out by CPU 41 and transferred via the data terminal DATA of I/O port 61 to the shift register in the serial/parallel converter 62. After the 24-bit data is stored in the shift register, CPU 41 causes the voltage at the timing terminal T of I/O port 61 to a high level [see FIG. 4(*a*)] while at the same time CPU 41 activates the timer circuit 47 and causes the voltage at the select terminal SEL of I/O port 61 to a high level indicative of the recording mode [see Fig 4(*d*)]. In response to the rising edge of the voltage at timing terminal T, the 24-bit data in the serial/parallel converter 62 is supplied to the AND gates 92. Since the output voltage from the OR gate 82 is at a high level, AND gates 92 are selectively enabled depending upon the presence of the bit of a character to be printed and produce a high-level voltage at its output. The associated switching transistors 90 are turned on so as to start current application to selected resistive thermo-generating elements 38. At a preset time T1, the timer circuit 47 sends an interrupt signal to CPU 41, which then executes an interrupting operation. CPU 41 allows the voltage at the timing terminal T to fall from a high to low level, and in response to this falling voltage, the monostable multivibrator 71 for printing mode is triggered to produce a pulse signal having a duration of T2[see Fig 4(*c*)]. As a result, the AND gate 75 and OR gate 82 continue to produce a high-level signal, ensuring continued application of a current to the selected resistive thermo-generating elements 38. The duration T2 of the pulse signal is determined by the resistance of thermistor 84 which depends on the temperature of the environment in which printing is performed. If the environmental temperature drops, say, from $\theta_1$ to $\theta_2$ in FIG. 5, the resistance of thermistor 84 changes to increase the duration of current application by T2 and the current is applied for a duration of (T1+T2+ΔT2), which is appropriate for printing mode as is evident from FIGS. 4 and 5. As a result, the solid ink is effectively transferred to the printing paper 7.

Figure 4:
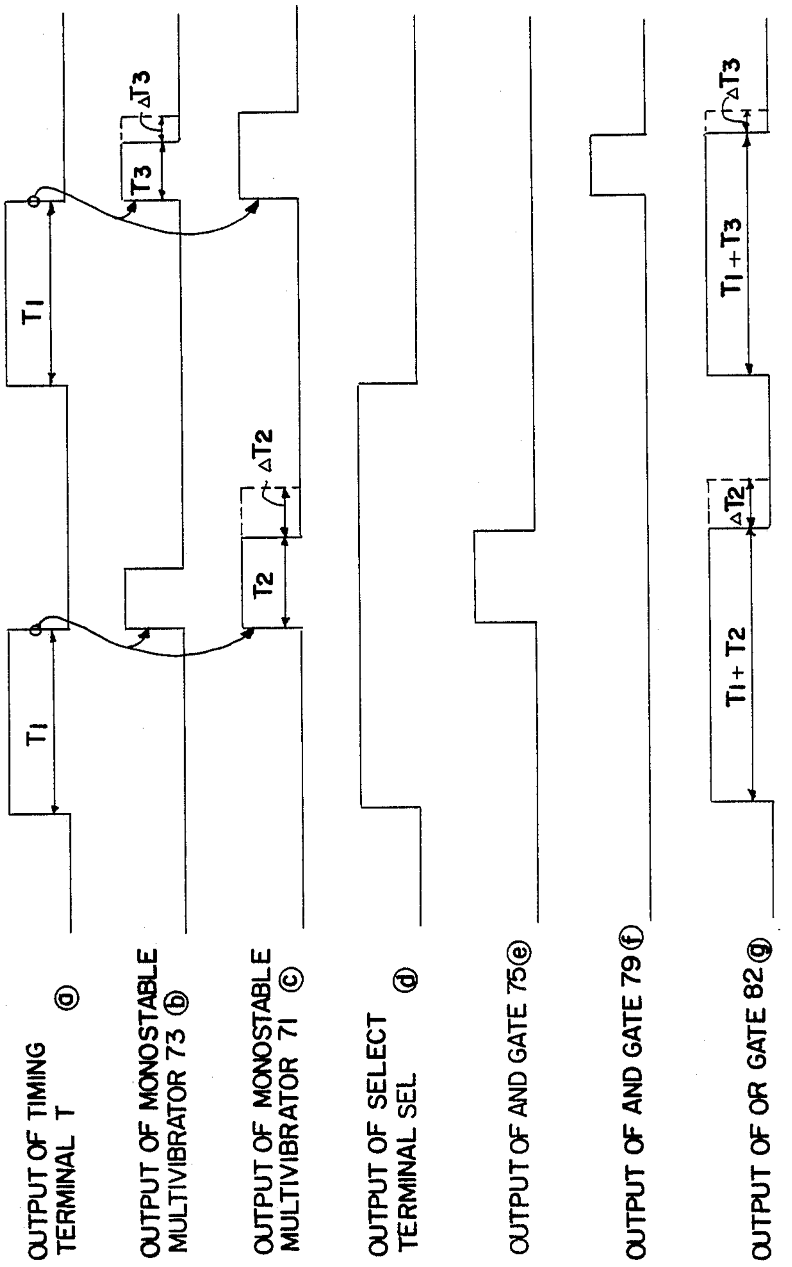
FIG. 4 is a timing chart showing the waveforms of signals generated from various components of the electronic control unit shown in FIG. 1.
Figure 5:
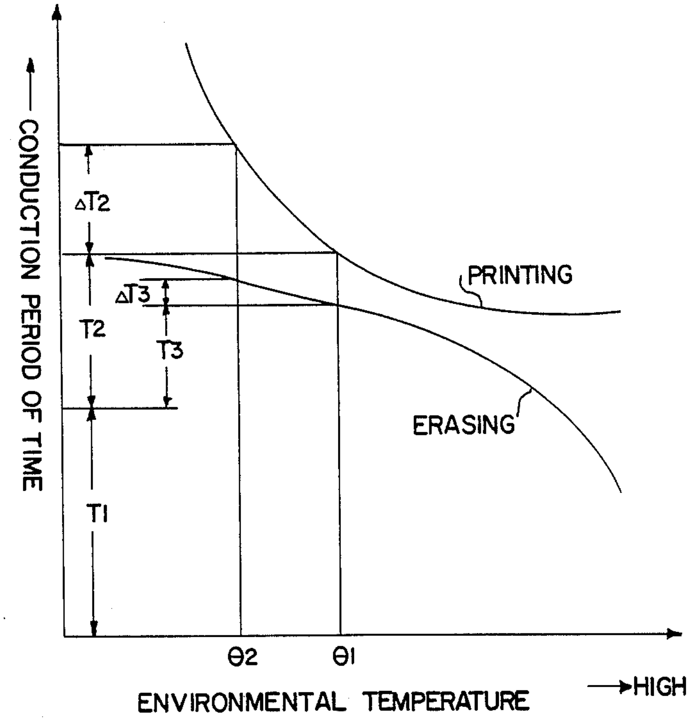
FIG. 5 is a graph showing the duration of current application vs. environmental temperature profiles for printing and correction modes.

In a correction mode, CPU 41 performs processing with the timing of each event being the same as in processing in a printing mode. The only difference is that CPU 41 causes the voltage at the select terminal SEL of I/O port 61 to a low level and the monostable multivibrator 73 for correction mode is triggered to produce a pulse signal having a duration T3 that also contributes to the duration of current application to the resistive thermo-generating elements 38. This duration T3 is also determined by the resistance of thermistor 86 which varies with the environmental temperature. If the environmental temperature changes, say from $\theta_1+\theta_2$, the duration of current application is extended to T1+T3+ΔT3 as shown in FIGS. 4 and 5. This allows the solid ink that has been transferred to the printing paper 7 to be effectively erased by adhering to the ink ribbon 30 irrespective of the change in the environmental temperature.

As described above, the printer 9 according to the embodiment being discussed has the ability to compensate for the duration of current application to the resistive thermo-generating elements 38 individually for printing and correction modes in response to changes in the environmental temperature, so not only can characters be impressed to produce a print of high quality but also the printed characters can be completely erased as required. Therefore, the printer of the present invention eliminates the need for adjusting the duration of current application according to the temperature of the place where the printer is to be used. In the embodiment discussed above, the timing signal T1 is set to have the same pulse width for both printing and correction modes, but it should be understood that different pulse durations may be employed for the two modes so as to increase the dynamic range over which the duration of current application can be effectively compensated for attaining the object of the present invention.

As will be understood from the foregoing description, the thermal transfer recording apparatus of the present invention has the advantage that not only can characters be impressed to produce a print of high quality but also the printed characters can be completely erased in spite of changes in the environmental temperature. As a consequence, the need for adjusting the quantity of electric power according to the specific temperature of the environment in which the apparatus is to be used is eliminated, thereby decreasing the time and cost involved in performing maintenance operations.

Although description has been made with reference to a specific embodiment, it can be understood that various modifications and changes may be made without departing from the scope and spirit of the present invention. For example, in lieu of proving monostable multivibrators, a time table may be provided in a read-only memory (ROM) in which stored are time data instructing the durations of the ON states of the switching transistors. The time data corresponding to the environmental temperature have previously been computed and stored with respect to each of the printing and erasure modes. When the environmental temperature is detected by the thermister, the output of the thermister which is in the form of an analog signal is converted to a digital signal and in response to the digital signal, one of the time data corresponding to the detected environmental temperature is read out of the table. The time data thus read out is applied to the switching transistor, so that the duration of the ON state of that transistor is controlled in accordance therewith.

Moreover, although it has been described that in order to control the heat generation of the thermal head, the duration of the ON state of the switching transistor is controlled while maintaining the voltage applied to the resistive thermo-generating elements at constant, the voltage applied thereto may be controlled while maintaining the duration of the ON state of the switching transistor at constant.

What is claimed is:

1. A thermal transfer recording apparatus comprising:

a thermo-generating means having a predetermined number of thermo-generating elements;

a voltage applying means connected to said predetermined number of thermo-generating elements;

a means carrying a heat-fusible ink, said ink, when heated by said thermo-generating means to a first temperature, being melted to be adhearable to a recording sheet to be capable of recording if said recording sheet is held in contact with said ink carrying means and said ink carrying means adsorbing said ink adhered to said recording sheet to perform erasing when said ink is heated by said thermo-generating means to a second temperature, wherein said second temperature is different from said first temperature;

a detection means for detecting an environmental temperature of said apparatus and outputting a temperature signal indicative of the detected environmental temperature;

a switching means having the same number of switching elements as said plurality of thermo-generating elements, each of said switching elements being connected in one-to-one correspondence to each of said thermo-generating elements and said switching elements being selectively rendered in ON state in response to a printing data for causing the associated thermo-generating elements to generate heat by a current flowing through said thermo-generating elements by a voltage applied by said voltage applying means;

a mode identifying means for identifying one of a printing mode and an erasing mode and outputting a mode signal indicative of one of said printing mode and said erasing mode; and a control means for controlling heat generation of said thermo-generating means in response to said temperature signal, said heat generation of said thermo-generating means being controlled to cause said ink carrying means to said first temperature when said mode signal is indicative of said printing mode and to cause said ink carrying means to said second temperature when said mode signal is indicative of said erasing mode.

2. A thermal transfer recording apparatus as claimed in claim 1, wherein said control means controls a duration of said ON state of said switching means.

3. A thermal transfer recording apparatus as claimed in claim 2, wherein said control means comprises a time data outputting means for outputting a time data, said duration of said ON state of said switching means being controlled in response to said time data.

4. A thermal transfer recording apparatus as claimed in claim 3, further comprising a time data storing means for storing said time data corresponding to said temperature signal and said mode signal.

5. A thermal transfer recording apparatus as claimed in claim 2, wherein said control means comprises a first control means for controlling the duration of said ON state of said switching means when said mode identification signal is indicative of said printing mode and a second control means for controlling the duration of said ON state of said switching means when said mode identification signal is indicative of said erasing mode.

6. A thermal transfer recording apparatus as claimed in claim 5, wherein said first control means includes a first monostable multivibrator for outputting a first pulse signal for controlling the duration of said ON state of said switching means in response to said temperature signal and said second control means includes a second monostable multivibrator for outputting a second pulse signal for controlling the duration of said ON state of said switching means in response thereto.

7. A thermal transfer recording apparatus as claimed in claim 6, wherein said detection means includes a first detection means coupled to said first control means and a second detection means coupled to said second control means.

8. A thermal transfer recording apparatus as claimed in claim 7, wherein said first detection means comprises a first thermistor and said second detection means comprises a second thermistor.

9. A thermal transfer recording apparatus as claimed in claim 1, wherein said second temperature is lower than said first temperature.

10. A thermal transfer recording apparatus as claimed in claim 1, wherein said ink carrying means is an ink ribbon having an elongated film base member and a solid ink coated on one surface of said base member.

* * * * *